United States Patent [19]

Hashimoto

[11] Patent Number: 4,647,083
[45] Date of Patent: Mar. 3, 1987

[54] SEPARATION PREVENTIVE PIPE JOINT

[75] Inventor: Takao Hashimoto, Tokyo, Japan

[73] Assignee: Kubota, Ltd., Osaka, Japan

[21] Appl. No.: 771,008

[22] Filed: Aug. 30, 1985

[30] Foreign Application Priority Data

Sep. 7, 1984 [JP] Japan .......................... 59-135146[U]

[51] Int. Cl.[4] .............................................. F16L 21/02
[52] U.S. Cl. .................................. 285/321; 285/374;
285/400; 285/340; 285/403; 285/368
[58] Field of Search ............... 285/104, 321, 337, 340,
285/400, 404, 368, 374, 339, 341, 399, 375, 403,
379

[56] References Cited

U.S. PATENT DOCUMENTS

| 1,146,670 | 7/1915 | Tippett | 285/337 |
|---|---|---|---|
| 3,423,111 | 1/1969 | Elsner | 285/340 |
| 3,937,500 | 2/1976 | Sato | 285/400 |
| 3,941,410 | 3/1976 | Miyaoka | 285/321 |
| 4,070,046 | 1/1978 | Felker et al. | 285/337 |
| 4,092,036 | 5/1978 | Sato et al. | 285/337 |
| 4,417,754 | 11/1983 | Yamaji et al. | 285/321 |
| 4,438,954 | 3/1984 | Hattori | 285/104 |
| 4,544,188 | 10/1985 | Dugger | 285/337 |
| 4,568,112 | 2/1986 | Bradley, Jr. et al. | 285/238 |

FOREIGN PATENT DOCUMENTS

| 1625928 | 4/1971 | Fed. Rep. of Germany | 285/340 |
|---|---|---|---|
| 2501823 | 6/1975 | Fed. Rep. of Germany | 285/340 |
| 2430562 | 3/1980 | France | 285/404 |
| 2199 | of 1886 | United Kingdom | 285/321 |
| 1403671 | 8/1975 | United Kingdom | 285/340 |

Primary Examiner—Cornelius J. Husar
Assistant Examiner—Eric K. Nicholson
Attorney, Agent, or Firm—Joseph W. Farley

[57] ABSTRACT

A separation preventive pipe joint comprises a socket and a spigot inserted into the socket with an annular packing interposed therebetween. An annular gland connected to the socket has an axial packing presser projection and is internally provided wtih an annular receptacle groove. Arcuate engaging segments are inclininigly disposed in a circular arrangement within the receptacle groove and retained there by elastic distancing members. The engaging segments are radially inwardly pressed by pressing bolts to engage in the spigot outer periphery. Each engaging the segment elastically deforms in a manner of a Belleville spring in response toseparating movement of the spigot to assume a posture generally perpendicular to the spigot outer periphery so that the engaging element engages in the spigot outer periphery more firmly.

4 Claims, 24 Drawing Figures

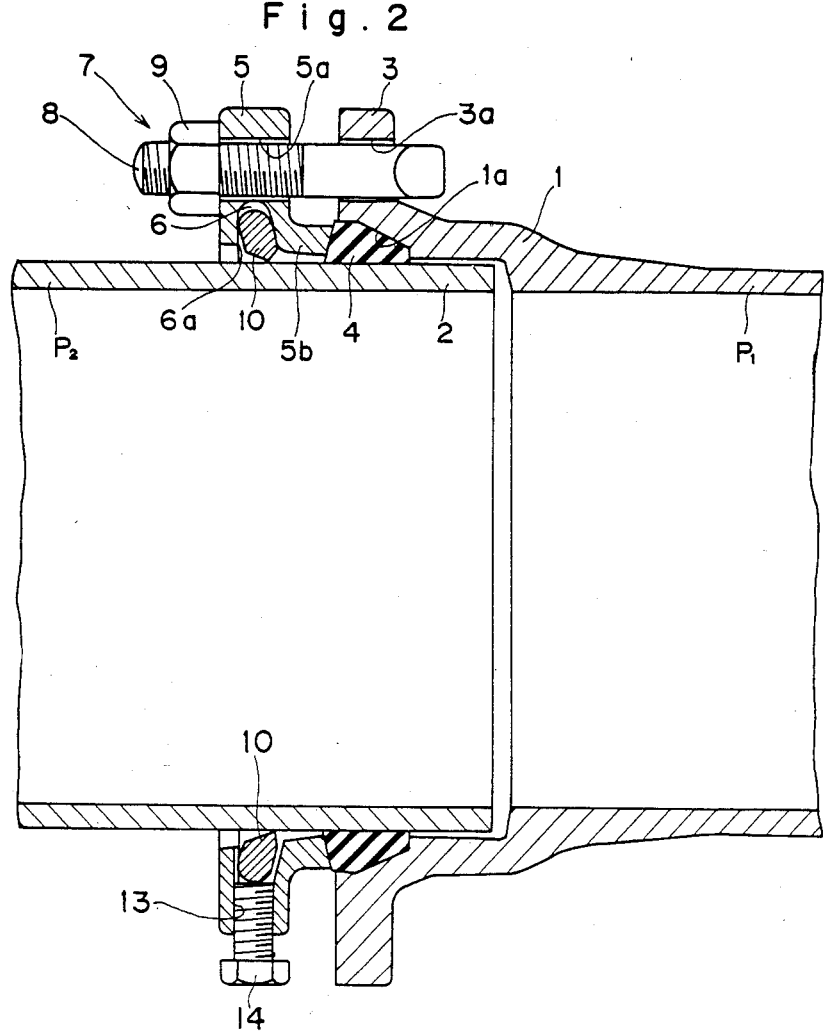
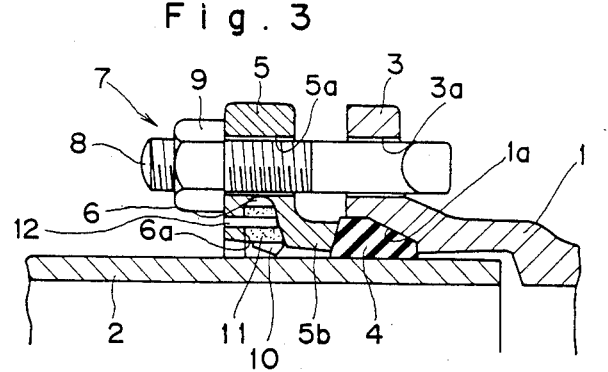

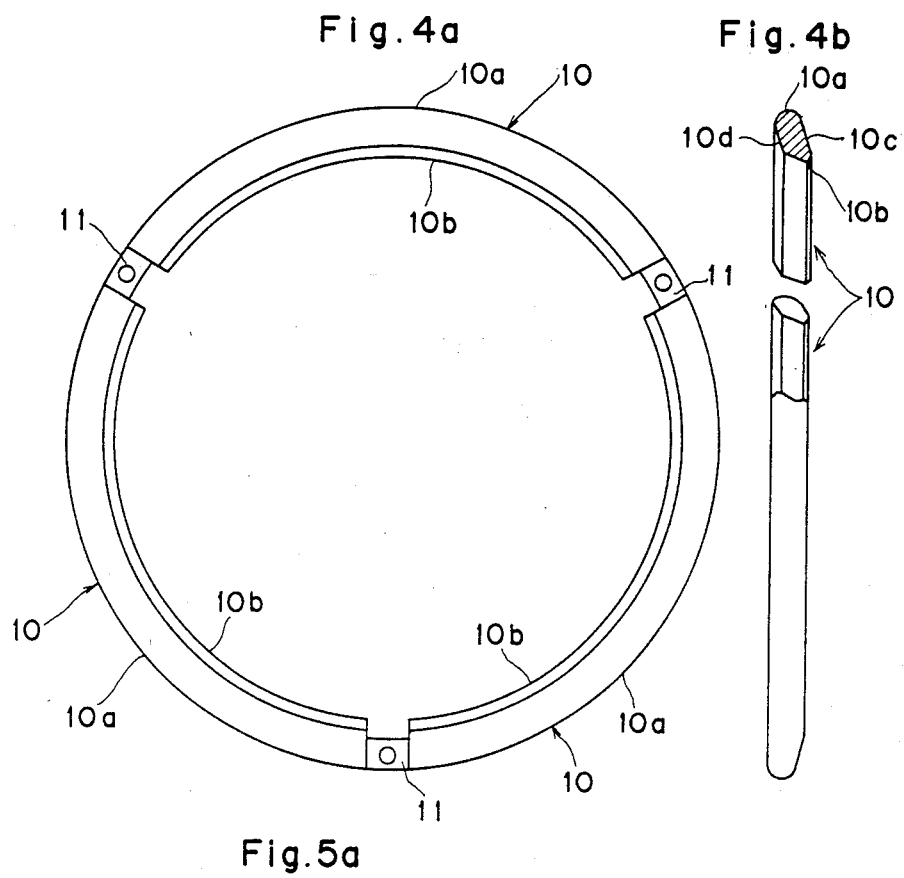

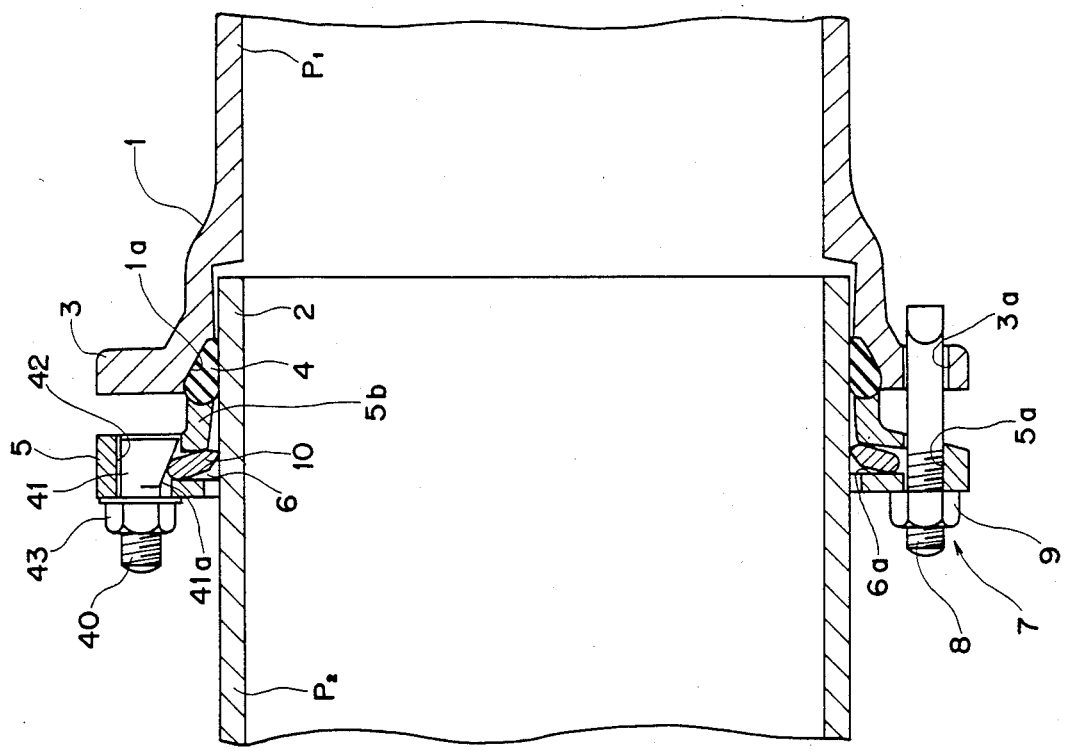
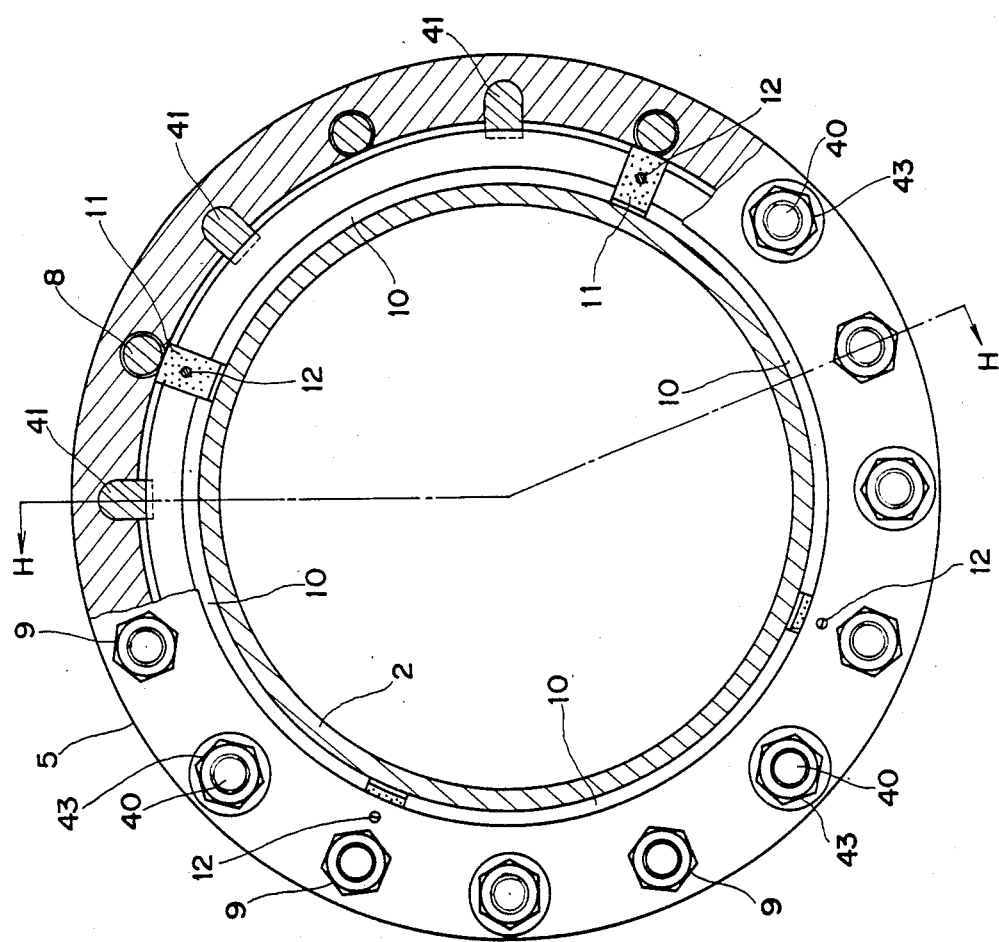

SEPARATION PREVENTIVE PIPE JOINT

FIELD OF THE INVENTION

The present invention relates generally to pipe joints to be used for water supply pipelines, gas supply pipelines and the like, and more particularly to separation preventive pipe joints having means for preventing a spigot from slipping off a socket.

BACKGROUND OF THE INVENTION

U.S. Pat. No. 4,417,754, Yamaji et al, discloses a separation preventive pipe joint comprising a holding member connectable to an annular outer flange formed at the end of a socket and surrounding the outer periphery of a spigot outside the socket, the holding member being annular or being adapted to form an annular shape, the holding member being provided on its inner periphery with a tapered surface increasing in diameter toward the socket; a stopper in the form of a ring divided at one portion and provided with an outer peripheral tapered surface increasing in diameter toward the socket and with engaging edges in circumferential rows on its inner periphery, the stopper being interposed between the tapered surface of the holding member and the spigot outer periphery; and tap bolts extending through the holding member at suitable portions along its circumference for pressing the stopper from outside against the spigot outer periphery.

According to this arrangement, when a separating force acts on the spigot, the engaging edges of the stopper ring engage in the spigot outer periphery to a greater degree by the wedging engagement of the stopper outer periphery with the tap bolts and/or the tapered inner periphery of the holding member, consequently producing an increasing separation preventive force. However, the prior art pipe joint has the following disadvantages.

(1) Since the stopper ring engages non-elastically with the tap bolts and the spigot outer periphery, the ring cannot fully follow or cope with the oscillation of the spigot relative to the socket, the oscillation being caused by internal fluid pressure variations (pulsating fluid flow) or other external influences. This results in loosening of the related parts after long use, ultimately leading to complete loss of separation prevention.

(2) The non-elastic engagement of the stopper ring allows a great separating force to be transmitted directly to the tap bolts and the holding member, possibly leading to breakage of the bolts and/or the holding member.

SUMMARY OF THE INVENTION

It is an object of the present invention to provide a separation preventive pipe joint which is free of the above disadvantages.

To fulfil this object, the present invention provides a separation preventive pipe joint comprising:

a socket;

a spigot sealingly inserted into said socket with an annular packing interposed therebetween;

receptacle groove means formed in a circular arrangement in the inner periphery of said socket or in the inner periphery of annular retainer means surrounding said spigot and engaging said socket, said groove means being positioned, when viewed axially of said socket, outwardly from said packing and provided with lateral stopper face means axially away from said packing;

engaging means arranged in a circular arrangement within said groove means and having radially outer head means and radially inner tip means, said engaging means being initially inclined so that said tip means is closer to said packing than said head means; and pressing means for radially inwardly pressing said engaging means at said head means so that said tip means engages in the outer periphery of said spigot;

whereby said engaging means elastically deforms in a manner of a Belleville spring in response to separating movement of said spigot so that said tip means pivots about said head means toward said stopper face means to further engage in the spigot outer periphery.

According to this arrangement, the engaging means can completely follow the oscillating movement of the spigot by the elastic deformation thereof with the engaging tip means of the engaging means engaging in the spigot outer periphery without any slide, the separation preventive force of the engaging means increasing as the separating movement of the spigot proceeds. The elastic nature of the engaging means allows the engaging means to partially absorb a separating force, so that a large separating force will not result in breakage of the pressing means or a member supporting it.

The engaging means may be in the form of a ring, preferably a split ring. Such an engaging ring assures a uniform separation preventive force over the entire circumference of the spigot.

Alternatively, the engaging means may comprise a plurality of arcuate engaging segments. The segmented engaging means is superior to the ring-form engaging means described above in cost and in the capability of replacing the individual segments.

In the case of using the segmented engaging means, the arcuate segments should preferably be held apart from each other by a corresponding number of distancing means which serve to retain the segments within the receptacle groove means prior to assembly of the joint (e.g. during transport to the assembly site). Each distancing means may comprise an elastic member or a combination of an elastic member and a partition wall.

According to an advantageous embodiment of the present invention, the pressing means comprises a plurality of axial bolts each having a wedge head provided with a tapered contact surface and received in a wedge chamber communicating the receptacle groove means, the wedge head being adapted to wedgingly press the engaging means against the spigot outer periphery when the bolt is tightened by a nut. This arrangement makes it possible to strongly press the engaging means against the spigot outer periphery with relatively weak tightening of the bolt. For example, if the inclination of the tapered contact surface of the wedge head is 30° and 20° respectively, the pressing force of the engaging means becomes 1.7 and 2.0 times the tightening force of the bolt.

The outer head means of the engaging means should preferably be generally arcuate, so that the pivotal elastic deformation of the engaging means is facilitated.

These and other features and advantages of the present inventions will be more readily understood from the description of embodiments given with reference to the accompanying drawings.

BRIEF DESCRIPTION OF DRAWINGS

FIG. 2 is a sectional view taken along line A—A in FIG. 1.

FIG. 3 is a sectional view taken along line B—B in FIG. 1.

FIG. 4a is a front view showing the engaging means.

FIG. 4b is a side view of the engaging means.

FIG. 5a is a side view showing a portion of the engaging means to illustrate the sectional configuration thereof.

FIG. 5b is a view similar to FIG. 5a showing the engaging means as thickened by build-up welding.

FIG. 20 is a view in transverse section of a further pipe joint embodying the invention.

FIG. 21 is a sectional view taken along line H—H in FIG. 20.

DESCRIPTION OF EMBODIMENTS

Figure 1:
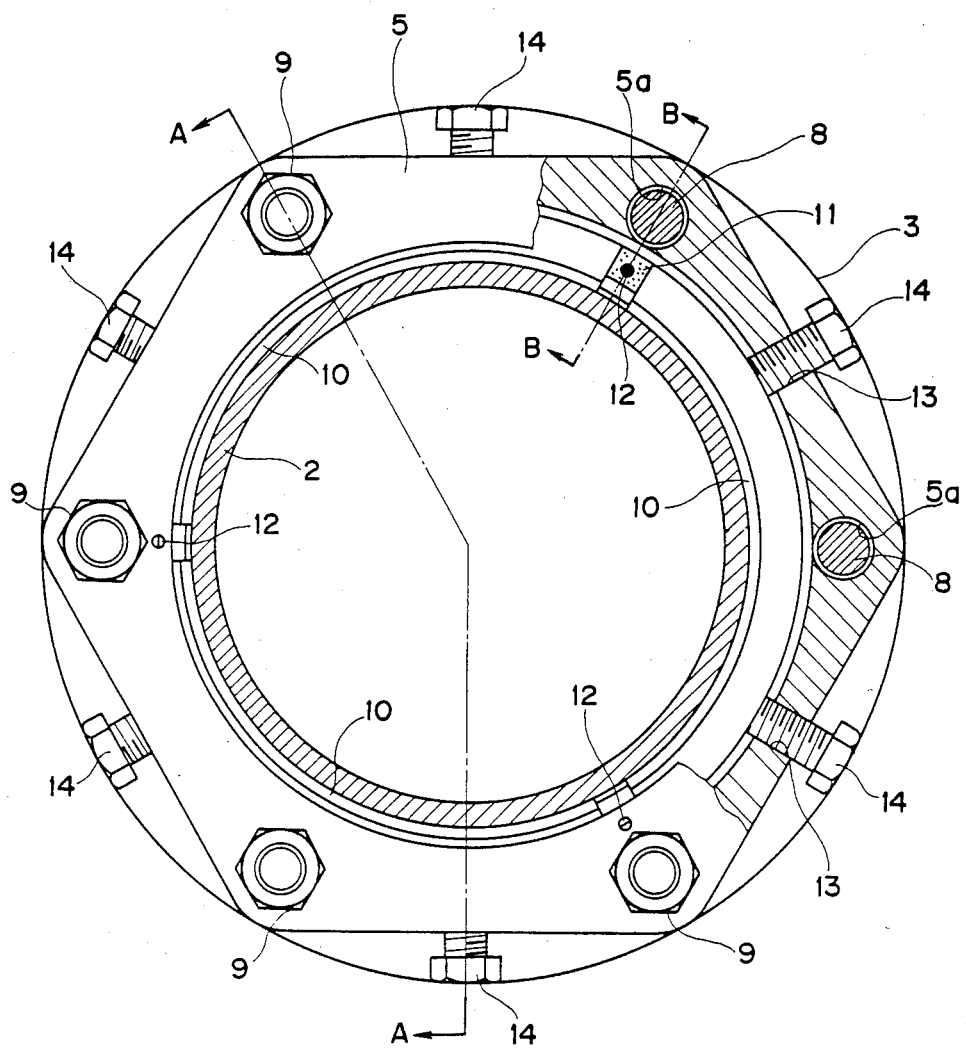
FIG. 1 is a view in transverse section of a pipe joint embodying the invention.

Referring to FIGS. 1 to 3, there are shown a first pipe $P_1$ having a socket 1 at one end thereof and a second pipe $P_2$ having a spigot 2 at one end thereof. The socket 1 is internally provided with an annular packing seat 1a at the open end thereof. The socket 1 is externally provided with an annular flange 3 having equiangularly spaced bolt holes 3a. An annular packing 4 is interposed between the packing seat 1a and the spigot 2.

Axially externally of the socket 1 and around the spigot 2 is arranged an annular gland 5 having bolt holes 5a corresponding to the bolt holes 3a of the annular flange 3. The gland 5 is provided with an axial presser projection 5b extending to contact the packing 4. The gland 5 is internally formed with an annular receptacle groove 6 defined partially by a lateral stopper face 6a. The gland 5 is mounted to the flange 3 by fastening means 7 consisting of bolts 8 and nuts 9.

A plurality (three in the illustrated embodiment) of arcuate engaging segments 10 are disposed within the receptacle groove 6 in a circular arrangement. The segments 10 are spaced apart from each other by hard rubber spacers 11 fixed in the groove 6 by pins 12 and serving to retain the segments 10 in place.

As illustrated in FIGS. 4a, 4b and 5a, each engaging segment 10 has a radially outer head 10a of an arcuate cross-section, a radially inner tip 10b of a V-shape cross-section, and two lateral surfaces 10c and 10d parallel to each other. In the initially assembled state, the engaging segment 10 is inclined by an angle $\alpha$, so that the V-shape tip 10b becomes closer to the packing 4 than the arcuate head 10a (see also FIGS. 2 and 3). The axial thickness t of the engaging segment 10 is slightly smaller than the width of the receptacle groove 6.

Each engaging segment 10 is elastic and for this purpose is made of metal such as ductile iron and steel. However, the segment 10 may also be made of other material such as hard synthetic resin (e.g. polyacetals, polycarbonate). If required, the strength of the segment 10 may be increased by conducting build-up welding on both lateral surfaces 10c and 10d as shown in FIG. 5b.

Returning to FIGS. 1 to 3, the gland 5 is formed with radial screw holes 13 opening to the receptacle groove 6. Pressing bolts 14 are screwed into the respective screw holes 13 to press the engaging segments 10 radially inwardly, so that the V-shape tips 10b of the segments 10 engage in the outer periphery of the spigot 2 with a predetermined initial force. The positional relation of each segment 10 to corresponding bolts 14 is such that the bolts 14 are symmetrical with respect to the center of the segment 10 to ensure a uniform pressing force along the entire length of the segment 10.

The pipe joint of the above construction is assembled in the following manner.

Prior to connecting the two pipes $P_1$ and $P_2$, the gland 5 is brought onto the spigot 2 with the engaging segments 10 held in place within the receptacle groove 6 by the rubber spacers 11, and the packing 4 is brought onto the spigot 2. Subsequently, the spigot 2 is inserted into the socket 1, and the packing 4 is pressed onto the packing seat 1a. Thereafter, the gland 5 is connected to the annular flange 3 by setting and tightening the fastening means 7 to axially compress the packing 4 by the axial projection 5b. Finally, the presser bolts 14 are tightened to press the engaging segments 10 against the spigot 2.

Next, the operation of the pipe joint is described.

Figure 6A:
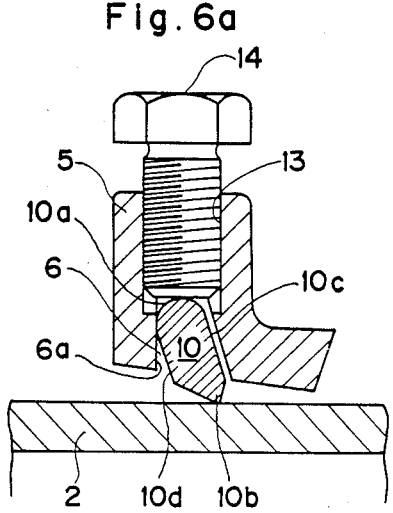
FIGS. 6a and 6b are longitudinal sectional views showing the operation of the pipe joint.
Figure 6B:
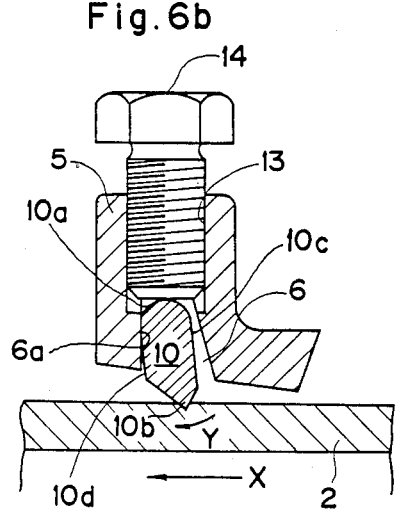

As shown in FIG. 6a, immediately after assembly the joint assumes the position in which each engaging segment 10 is inclined with its arcuate head 10a contacting the lower end face of each bolt 14 and the stopper face 6a of the receptacle groove 6, the V-shape tip 10b of the segment 10 lightly engaging in the outer periphery of the spigot 2. If the spigot 2 moves in the separating direction (arrow X) as shown in FIG. 6b, the segment 10 elastically deforms in a manner of a Belleville spring so that the tip 10b pivots about the head 10a which is restrained by the bolt 14 and the stopper face 6a. As a result, the tip 10b of the segment 10 engages more deeply in the spigot outer periphery. Since the pivotal deformation of the segment 10 is regulated by the abutment of one lateral surface 10d with the stopper face 6a, the separation of the spigot 2 can thus be reliably prevented.

The following examples are given to illustrate the separation preventive effects of the pipe joint shown in FIGS. 1 to 3.

EXAMPLE I (Watertightness Test of Joint in Straight Condition)

The pipes $P_1$ and $P_2$ used were straight ductile iron pipes with an interior mortar lining and had a nominal diameter of 30 mm and a wall thickness of 6.5 mm. Each engaging segment 10 was made of FCD 45 (Material: ductile iron; Extensibility: 10% or more; Tensile strength: 45 kgf/mm$^2$; Proof stress: 29 kgf/mm$^2$) and had an axial thickness t of 10 mm, a radial thickness h of 20 mm and an initial inclination $\alpha$ of 13° (see FIG. 5a). Each presser bolt 14 was tightened at a torque of 800 kgf-cm.

With the pipes $P_1$ and $P_2$ connected in exact axial alignment, the internal water pressure was increased up to 60 kgf/cm$^2$ (corresponding to a separating force of 49.1 ton), but no faults nor abnormalities were found with respect to the joint and the mortar lining. The separation of the spigot 2 relative to the socket 1 was 4.62 mm at the largest.

EXAMPLE II (Watertightness Test of Joint in Deflected Condition)

The same procedure as in EXAMPLE I was repeated except that the pipes $P_1$ and $P_2$ were connected at an angle of 3°20′. This time again, no faults nor abnormalities were found, and the maximum separation was 4.62 mm.

Figure 7:
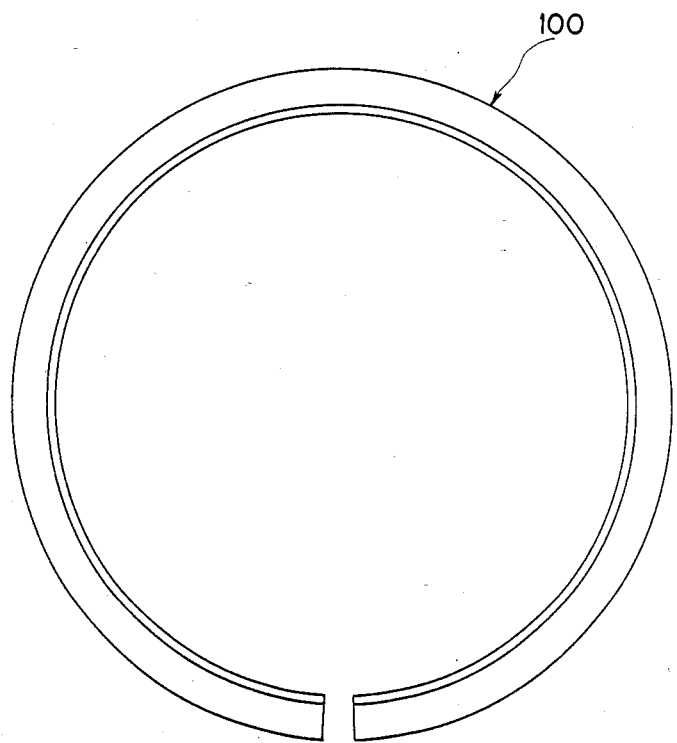
FIG. 7 is a front view showing another form of the engaging means.

The rubber spacers 11 may be replaced by coil spring spacers or other types of spacers. Since the purpose of these spacers is to retain the engaging segments 10 within the receptacle groove 6 prior to the assembly of the joint, these spacers may be omitted in certain cases. Further, a plurality of arcuate engaging segments may be connected directly to each other by dovetail or tenon engagement to form a self-supporting ring. In place of using separate engaging segments arranged in a circular arrangement, a single non-divided engaging ring or a single split engaging ring 100 such as shown in FIG. 7 may be used.

Figure 9:
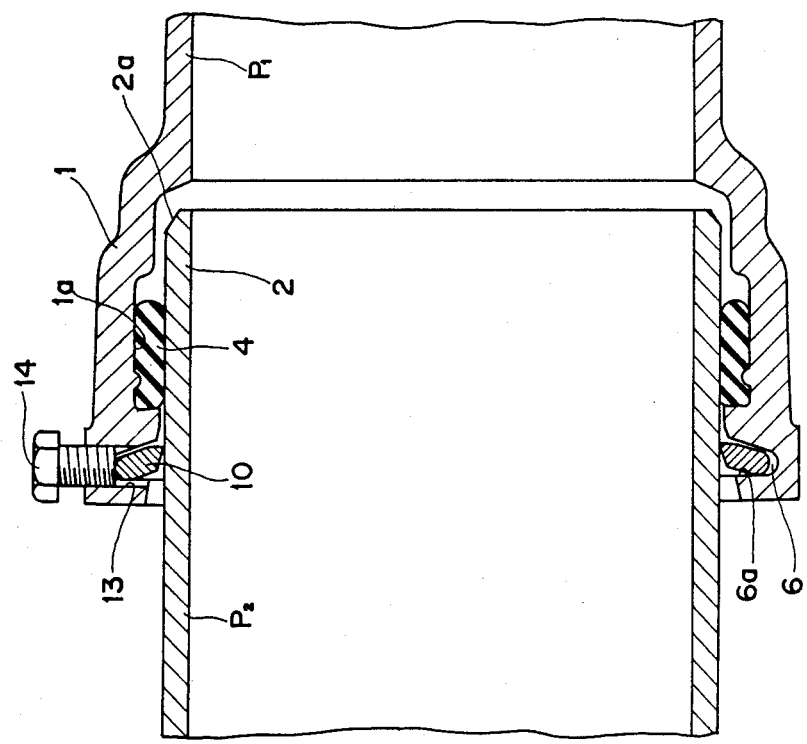
FIG. 9 is a sectional view taken along line C—C in FIG. 8.
Figure 8:
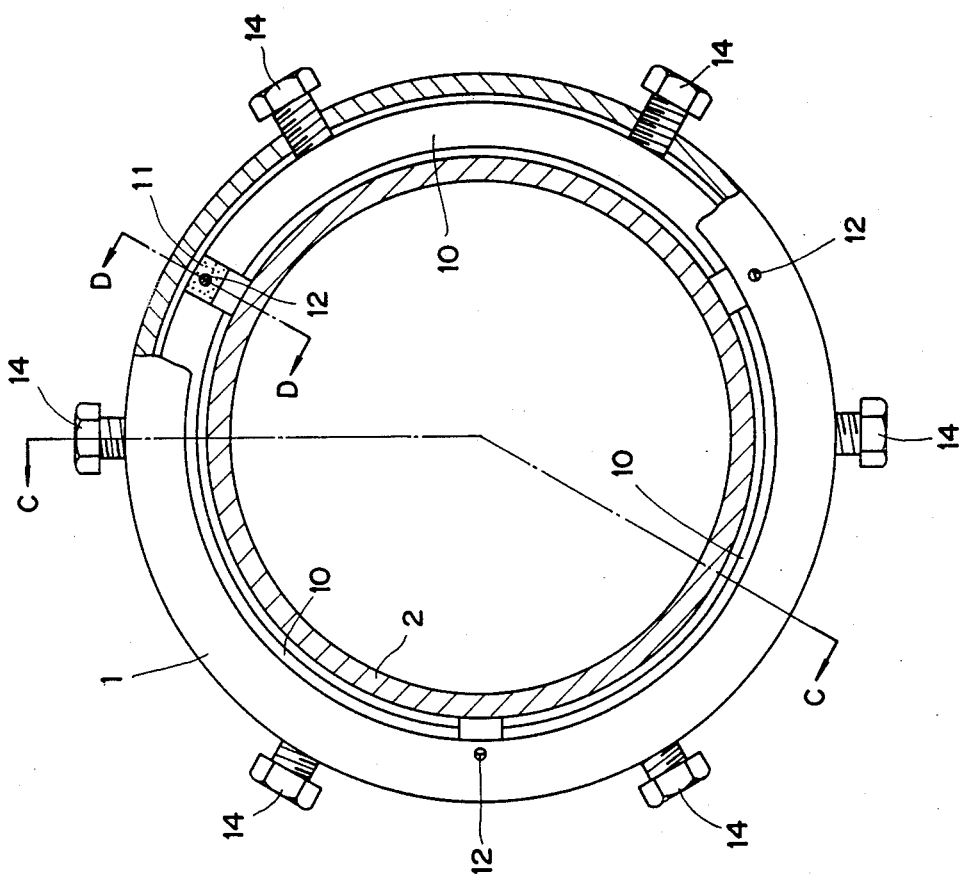
FIG. 8 is a view in transverse section of another pipe joint embodying the invention.
Figure 10:
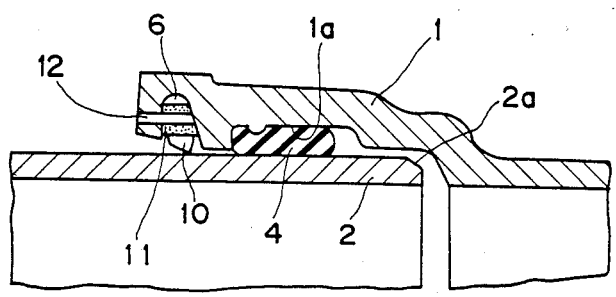
FIG. 10 is a sectional view taken along line D—D in FIG. 8.

FIGS. 8 to 10 illustrate another pipe joint in which an annular packing seat 1a is provided in the inner periphery of a socket 1 axially inwardly from the socket end face, and an annular receptacle groove 6 is formed in the inner periphery of the socket 1 between the socket end face and the packing seat 1a. The socket 1 is provided with screw holes 13 into which presser bolts 14 are screwed to press arcuate engaging segments 10. Thus no separate retainer is provided for the segments 10. Indicated at 2a is a chamfered end of a spigot 2. Otherwise, this pipe joint is substantially the same as the one described with reference to FIGS. 1 to 3.

Figure 11:
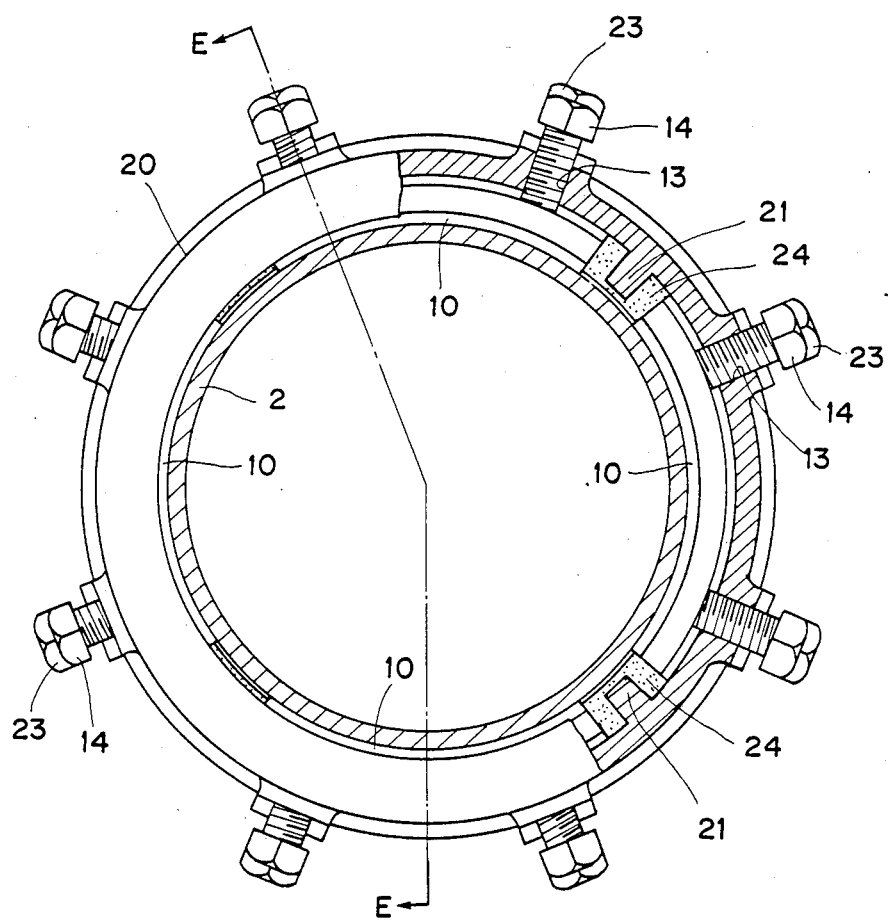
FIG. 11 is a view in transverse section of a further pipe joint embodying the invention.
Figure 12:
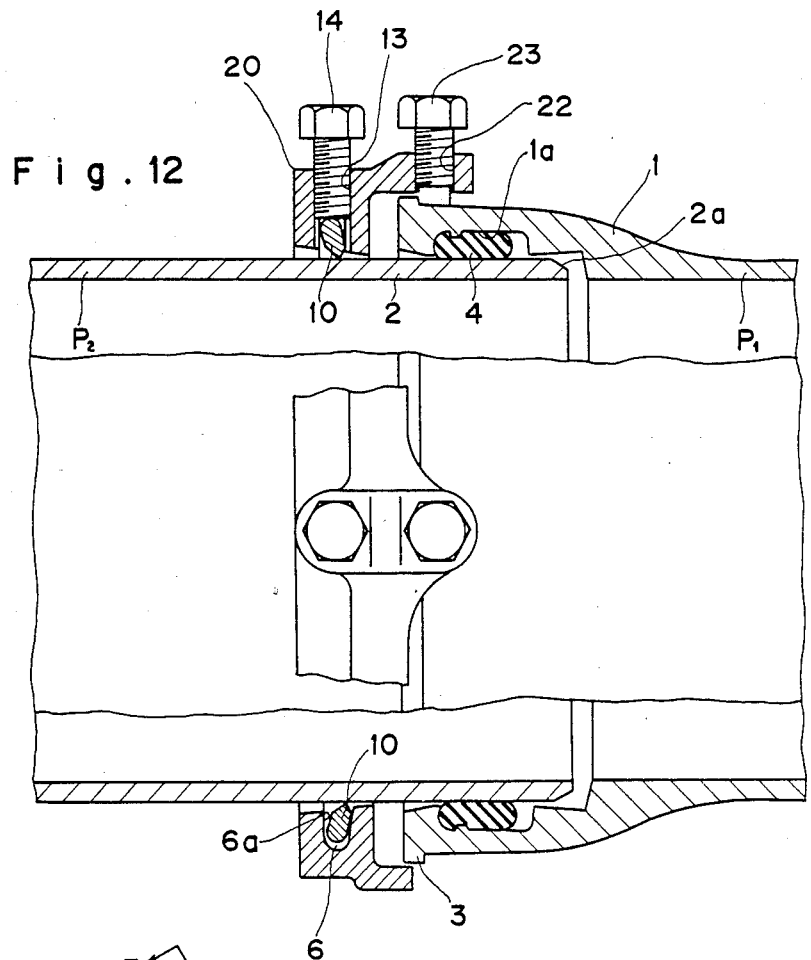
FIG. 12 is a sectional view taken along line E—E in FIG. 11.

The pipe joint shown in FIGS. 11 and 12 comprises an annular retainer housing 20 internally provided with a plurality (four in the illustrated embodiment) of arcuate receptacle grooves 6 partially defined by lateral stopper faces 6a and separated from each other by partition walls 21. The housing 20 is further provided with a first group of screw holes 13 for presser bolts 14 and a second group of screw holes 22 for mount screws 23 which are used to fix the housing 20 to a socket 1 having an annular engaging flange 3. Arcuate engaging segments 10 are respectively received in the receptacle grooves 6 and held in place by generally U-shaped rubber spacers 24 fitted on the partition walls 21. The socket 1 is internally provided with an annular packing seat 1a slightly away from the socket end face. An annular packing 4 is squeezed between the packing seat 1a and a spigot 2 having a chamfered end 2a. Naturally, this pipe joint operates substantially in the same manner as the gland-type pipe joint shown in FIGS. 1 to 3.

Figure 13:
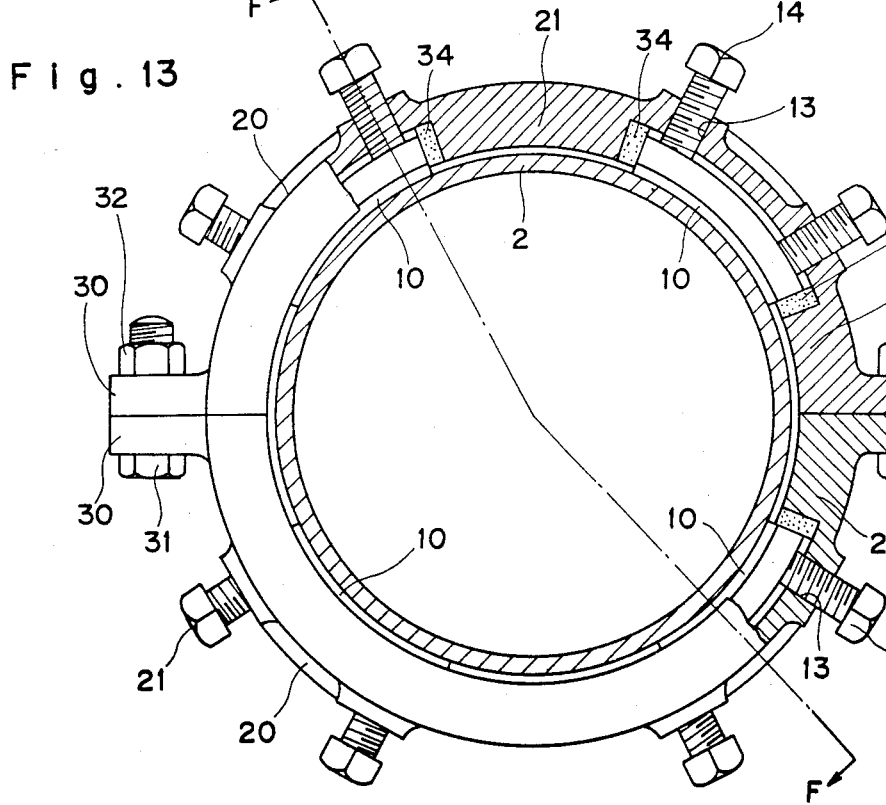
FIG. 13 is a view in transverse section of a still further pipe joint embodying the invention.
Figure 14:
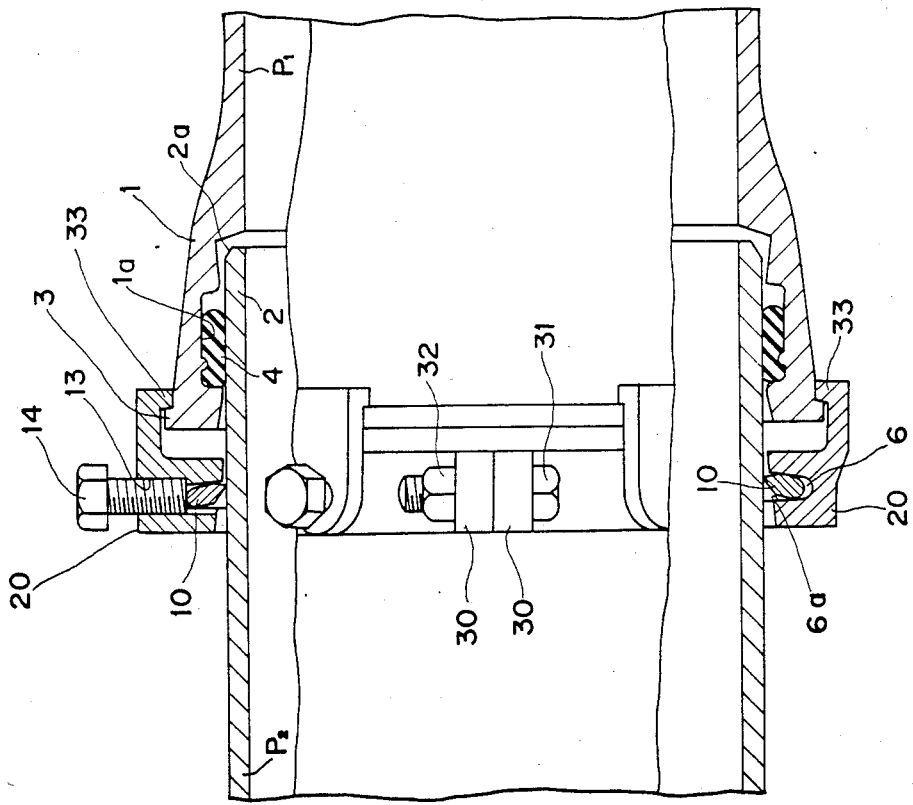
FIG. 14 is a sectional view taken along line F—F in FIG. 13.

The pipe joint shown in FIGS. 13 and 14 differs from the joint of FIGS. 11 and 12 in the following respects.

(a) An annular retainer housing consists of two half sections 20 having side projections 30 connected together by bolts 31 and nuts 32.

(b) Each housing section 20 has a radial inward projection 33 which engages the radial outward projection 3 of the socket 1.

(c) The receptacle grooves 6 are separated from each other by circumferentially elongated partition walls 21.

(d) Two separate rubber spacers 34 are along the walls of each partition 21.

Figure 15:
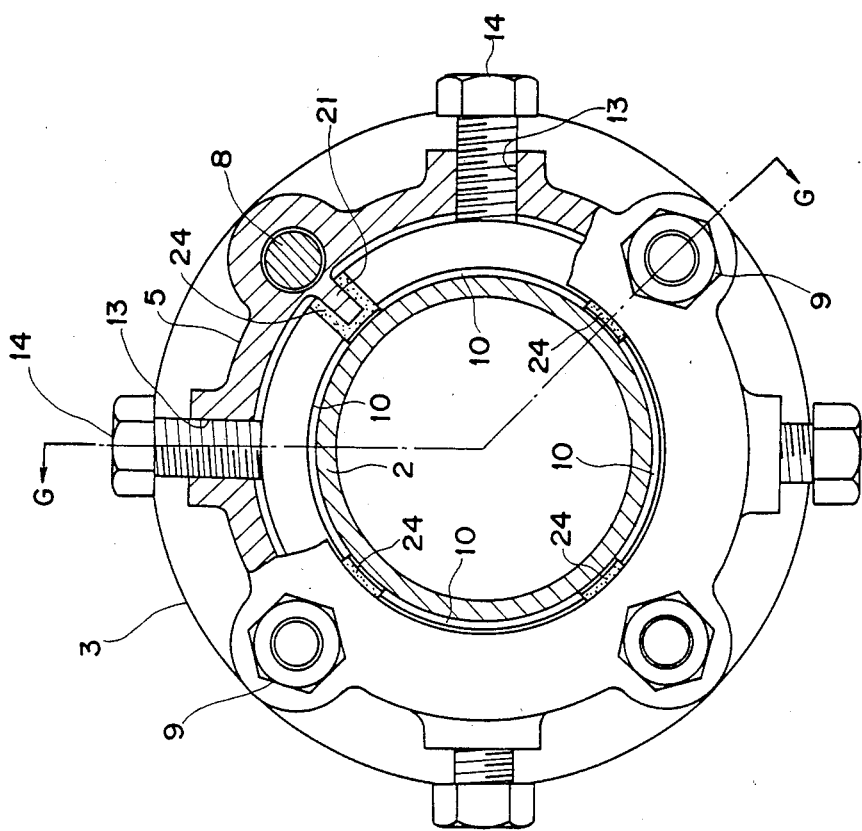
FIG. 15 is a view in transverse section of still another pipe joint embodying the invention.
Figure 16:
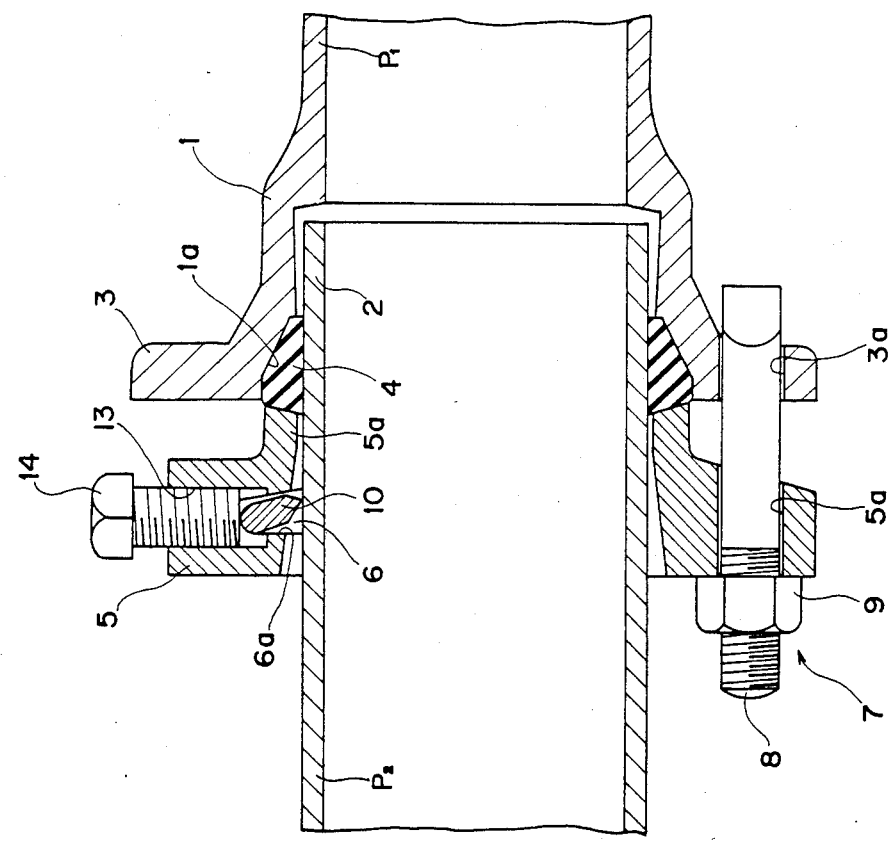
FIG. 16 is a sectional view taken along line G—G in FIG. 15.

FIGS. 15 and 16 show a pipe joint which is similar to that of FIGS. 1 to 3 in basic construction but differs therefrom in that arcuate engaging segments 10 are individually received in arcuate receptacle grooves 6. The grooves 6 are separated from each other by partition walls 21 on which are fitted generally U-shaped rubber spacers 24 to hold the segments 10 in place. Each segment 10 is pressed centrally by a single presser bolt 14.

Figure 18:
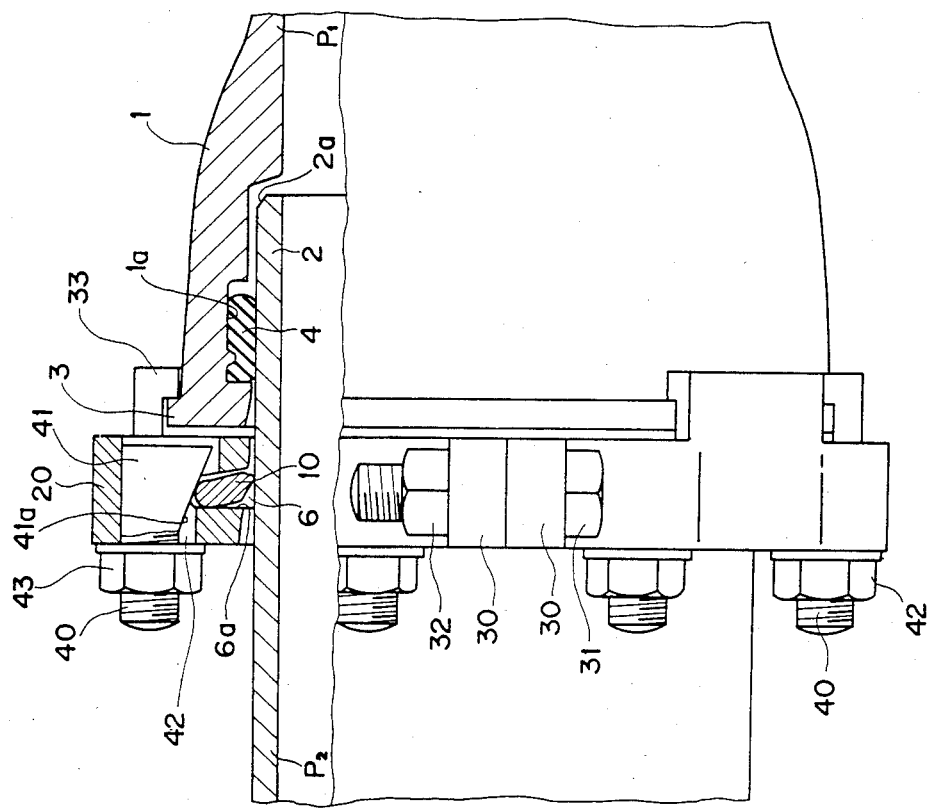
FIG. 18 is a view partly in longitudinal section of the pipe joint.
Figure 17:
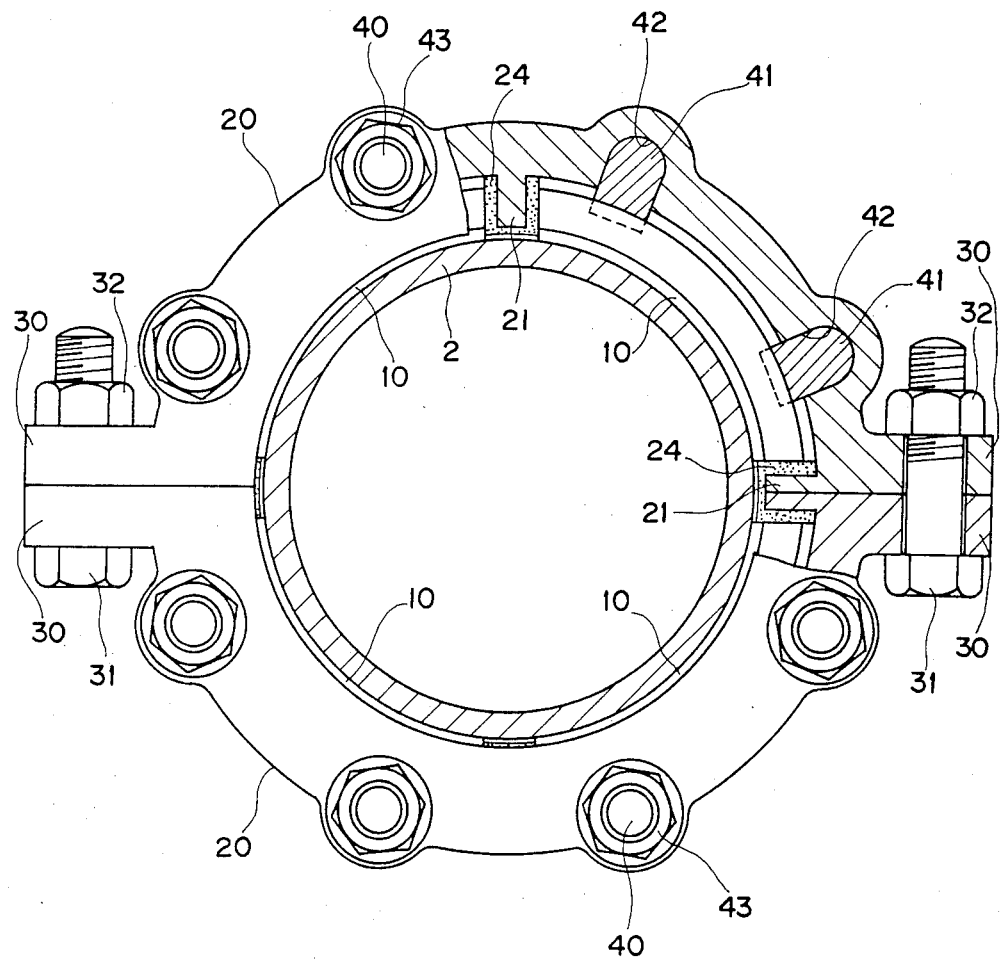
FIG. 17 is a view in transverse section of a still further pipe joint embodying the invention.

The most important feature of the pipe joint illustrated in FIGS. 17 to 18 is the use of axial bolts 40. Each bolt 40 has a wedge head 41 movably housed in a wedge chamber 42 formed in a retainer housing consisting of connected two half sections 20. The wedge head 41 has a tapered contact surface which press arcuate engaging segments 10 radially against the outer periphery of the spigot 2 with an amplified force when the bolt 40 is tightened up by a nut 43. The arrangement of the other parts related to the segments 10 is similar to that shown in FIGS. 11 and 12.

Figure 19:
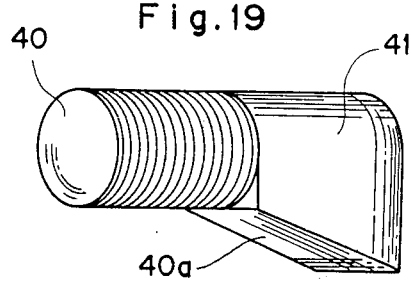
FIG. 19 is a perspective view showing the pressing means on a larger scale.

The pipe joint of FIGS. 20 and 21 is substantially the same as the pipe joint of FIGS. 1 to 3 except that wedge head axial bolts 40 similar to those shown in FIGS. 17 to 19 are used for pressing the arcuate engaging segments 10.

I claim:

1. A separation preventive pipe joint comprising:
   a socket;
   a spigot sealingly inserted into said socket with an annular packing interposed therebetween;
   receptacle groove means formed in a circumferentially continuous circular arrangement in the inner periphery of said socket or in the inner periphery of annular retainer means surrounding said spigot and engaging said socket, said groove means being positioned axially outwardly from said packing and provided with lateral stopper face means positioned axially away from said packing;
   engaging means comprising a plurality of arcuate engaging segments spaced by elastic spacer members and arranged in a circular arrangement within said groove means, said engaging segments having radially outer head means and radially inner tip means, each engaging segment being initially inclined so that said tip means is closer to said packing than said head means; and
   pressing means for radially inwardly pressing said engaging segments at said head means so that said tip means engages in the outer periphery of said spigot;
   whereby said engaging means elastically deforms in a manner of a Belleville spring in response to separating movement of said spigot so that said tip means pivots about said head means toward said stopper face means to further engage in the spigot outer periphery.

2. A pipe joint as defined in claim 1 wherein each of said elastic spacer members is made of hard rubber and is anchored in said groove means by a pin.

3. A separation preventive pipe joint comprising:
a socket;
a spigot sealingly inserted into said socket with an annular packing interposed therebetween;
receptacle groove means having a plurality of arcuate sections partitioned by partition walls and formed in a circular arrangement in the inner periphery of said socket or in the inner periphery of annular retainer means surrounding said spigot and engaging said socket, said groove means being positioned axially outwardly from said packing and provided with lateral stopper face means positioned axially away from said packing;
engaging means comprising a plurality of arcuate engaging segments corresponding in number to the sections of said groove means received in the respective arcuate sections of said groove means and having radially outer head means and radially inner tip means, each engaging segment being initially inclined so that said tip means is closer to said packing than said head means;
elastic spacers disposed between said engaging segments and said partition walls; and
pressing means for radially inwardly pressing said engaging segments at said head means so that said tip means engages in the outer periphery of said spigot;
whereby said engaging means elastically deforms in a manner of a Belleville spring in response to separating movement of said spigot so that said tip means pivots about said head means toward said stopper face means to further engage in the spigot outer periphery.

4. A pipe joint as defined in claim 3 wherein each of said elastic spacers is a generally U-shaped rubber member fitted on each partition wall.

* * * * *